US011145208B1

(12) United States Patent
Nanda et al.

(10) Patent No.: US 11,145,208 B1
(45) Date of Patent: Oct. 12, 2021

(54) CUSTOMIZED ROUTE TRACKING

(71) Applicant: Samsara Networks Inc., San Francisco, CA (US)

(72) Inventors: Sachal Nanda, San Francisco, CA (US); Greg Hogan, Mountain View, CA (US); Jennifer Julia Zhang, San Francisco, CA (US); Kathryn Siegel, San Francisco, CA (US); Kelsey Lam, Fremont, CA (US); Sean McGee, San Francisco, CA (US); Alex Wu, San Francisco, CA (US); Tirso Peguero, San Francisco, CA (US); Emily White, Park City, UT (US); Eric Shreve, San Francisco, CA (US); Wei Wu, San Francisco, CA (US); Chaein Jung, Seoul (KR); Helen Chung, Great Falls, VA (US); Sachie Weber, Aspen, CO (US); Yosub Shin, Seoul (KR); Utkarsh Jaiswal, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 17/249,827

(22) Filed: Mar. 15, 2021

(51) Int. Cl.
*G08G 1/00* (2006.01)
*G01C 21/36* (2006.01)
*G08G 1/123* (2006.01)

(52) U.S. Cl.
CPC .......... *G08G 1/20* (2013.01); *G01C 21/3626* (2013.01); *G01C 21/3691* (2013.01); *G08G 1/123* (2013.01)

(58) Field of Classification Search
CPC ...... G08G 1/123; G08G 1/20; G01C 21/3626; G01C 21/3691
USPC .......................................................... 701/533
See application file for complete search history.

(56) References Cited

U.S. PATENT DOCUMENTS

| 5,948,040 | A | * | 9/1999 | DeLorme | G09B 29/106 |
| | | | | | 701/426 |
| 10,832,206 | B2 | * | 11/2020 | Lafrance | G06Q 10/08355 |
| 10,895,463 | B1 | * | 1/2021 | Cope | G01C 21/3484 |
| 10,970,746 | B2 | * | 4/2021 | Singhal | B62D 15/00 |
| 2012/0253548 | A1 | * | 10/2012 | Davidson | G06Q 10/0631 |
| | | | | | 701/1 |
| 2013/0069803 | A1 | * | 3/2013 | McCormick | G01C 21/34 |
| | | | | | 340/989 |

(Continued)

FOREIGN PATENT DOCUMENTS

| WO | WO-2015036471 | A | * | 3/2015 | .......... G08G 1/0112 |
| WO | WO-2015179532 | A1 | * | 11/2015 | ....... G06Q 10/08355 |

(Continued)

*Primary Examiner* — Atul Trivedi
(74) *Attorney, Agent, or Firm* — Schwegman Lundberg & Woessner, P.A.

(57) ABSTRACT

Disclosed are systems, methods, and non-transitory computer-readable media for automated fleet tracking. A route management system enables fleet managers to define and assign routes for vehicles in a fleet, as well as set route tracking configurations for customized tracking of the vehicles. For example, the route tracking configuration may include customizations to the scheduled start and/or end time of a route, a threshold for determining that a vehicle has arrived and/or departed from a scheduled stop, and the like.

18 Claims, 13 Drawing Sheets

(56) References Cited

U.S. PATENT DOCUMENTS

| | | | | |
|---|---|---|---|---|
| 2013/0116916 A1* | 5/2013 | Kickbusch | .......... | B61L 27/0016 |
| | | | | 701/118 |
| 2013/0253833 A1* | 9/2013 | Tuukkanen | ............ | G01C 21/36 |
| | | | | 701/538 |
| 2015/0338226 A1* | 11/2015 | Mason | ................... | G06Q 10/04 |
| | | | | 701/408 |
| 2016/0307155 A1* | 10/2016 | Bell | ................ | G06Q 10/06315 |
| 2016/0358471 A1* | 12/2016 | Hajj | ................... | G01C 21/3423 |
| 2017/0262786 A1* | 9/2017 | Khasis | ........... | G06Q 10/063114 |
| 2018/0188042 A1* | 7/2018 | Chen | ................... | G06K 9/4671 |
| 2018/0209789 A1* | 7/2018 | Bryant | .................... | H04W 4/02 |
| 2018/0322431 A1* | 11/2018 | Folck | ................. | G06Q 30/0601 |
| 2019/0185010 A1* | 6/2019 | Ganguli | .......... | B60W 30/18163 |
| 2019/0187707 A1* | 6/2019 | Zheng | ................... | B60W 30/12 |
| 2019/0258251 A1* | 8/2019 | Ditty | .................. | G06K 9/00805 |
| 2020/0193549 A1* | 6/2020 | Pedersen | ............. | G05D 1/0088 |
| 2020/0200553 A1* | 6/2020 | Voznesensky | ........ | B60W 40/06 |
| 2020/0269877 A1* | 8/2020 | Mortazavi | ......... | B60W 60/0025 |
| 2020/0341490 A1* | 10/2020 | Silva | ............... | B60W 60/00256 |
| 2020/0353917 A1* | 11/2020 | Leitermann | ..... | B60W 60/00272 |
| 2020/0353937 A1* | 11/2020 | Bennett | ................ | B60W 40/09 |
| 2020/0357198 A1* | 11/2020 | Bennett | ............... | G06F 16/9035 |
| 2021/0026353 A1* | 1/2021 | Luo | ....................... | G01S 15/931 |
| 2021/0026360 A1* | 1/2021 | Luo | .................... | G06K 9/00805 |
| 2021/0092551 A1* | 3/2021 | Millington | ........... | G08G 1/0112 |
| 2021/0118330 A1* | 4/2021 | Baer | .................... | G08G 1/0967 |

FOREIGN PATENT DOCUMENTS

| | | | | |
|---|---|---|---|---|
| WO | WO-2020131222 A1 * | 6/2020 | ........... | G08G 1/0112 |
| WO | WO-2020132141 A1 * | 6/2020 | ............. | G06Q 50/10 |

\* cited by examiner

Route Tracking Window ⓘ

Expand the route tracking window beyond the scheduled start and end times.

Start of tracking window hour(s) before the route's scheduled start time
— 702

End of tracking window hour(s) after the route's scheduled end time
— 704

Route Stop Thresholds

Configure how long a vehicle needs to be at a stop for it to count as an arrival and departed from a stop to count as a departure.

Arrival threshold

[2] minute(s) [0] second(s) at a stop

Departure threshold

[0] minute(s) [30] second(s) at a stop

*FIG. 7C*

CUSTOMIZED ROUTE TRACKING

TECHNICAL FIELD

Embodiments of the present subject matter relate generally to vehicles and, more specifically, to customized route tracking.

BACKGROUND

Fleet managers track the movement of their vehicles to ensure that they are operating as expected. For example, fleet managers may track whether a vehicle began a route at an expected time, arrived at scheduled stops along the route, and completed the route. This process is often performed manually using periodic check calls to the vehicle operators for a current status. Aside from being time and resource consuming, this manual process was often prone to human error as a result of a fleet manager forgetting to check with a vehicle operator and/or a vehicle operator forgetting to provide a status update. Software solutions for vehicle tracking have become available, however these solutions do not account for the different types of fleets. For example, long hauling trucks have different route behavior than city busses and the two should be tracked differently. Accordingly, improvements are needed.

BRIEF DESCRIPTION OF THE DRAWINGS

To easily identify the discussion of any particular element or act, the most significant digit or digits in a reference number refer to the figure number in which that element is first introduced.

FIGS. 7A-7D show a user interface for setting route tracking configurations, according to some example embodiments.

DETAILED DESCRIPTION

Figure 1:
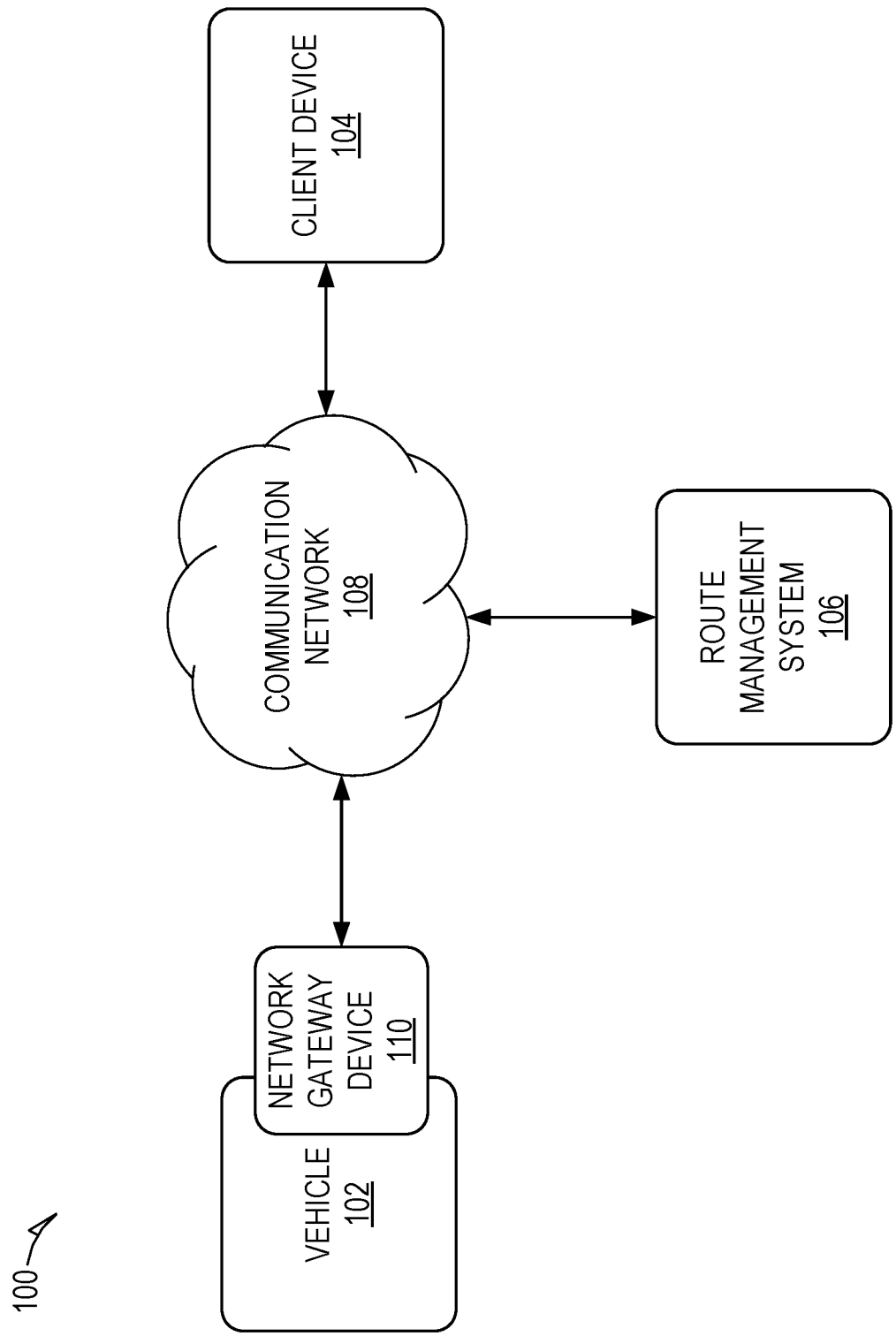
FIG. 1 shows a system for customized route tracking, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for customized route tracking. A route management system provides for automated fleet tracking. For example, the route management system enables fleet managers to define and assign routes for vehicles in a fleet. A route may be defined based on a set of route variables that describe the route. For example, the set of route variables may include a beginning and ending location of the route, scheduled stops along the route, an order at which the vehicle is to stop at each scheduled stop, a scheduled beginning and ending time of the route, a scheduled arrival and departure time at the scheduled stops, and the like.

The route management system uses the set of route variables defining each route along with sensor data describing the geographic location and/or movement of the vehicles to generate route tracking reports. A route tracking report is a file or document that includes data indicating the movement of a vehicle in relation to its assigned route. For example, the route tracking report may indicate whether a vehicle began and/or ended its route on time, arrived at each of its scheduled stops, arrived and/or departed from each scheduled stop on time, completed the route in the correct order, and the like.

As explained earlier, different types of fleets operate in varying ways. For example, long hauling trucks operate differently than city busses in that long hauling trucks stop and remain at each stop for a relatively long duration, whereas a city bus may not stop at each stop and generally stops for a short period of time. Further, a city bus generally operates according to a tight time schedule for arrival at each stop, whereas the timeliness of a long hauling truck may be looser. Tracking different types of fleets should therefore be performed in a manner based on the operation of the type of fleet.

To allow for customized route tracking, the route management system enables fleet managers to set route tracking configurations for tracking vehicles. A route tracking configuration includes one or more tracking customizations to the set of route variables defining each route. For example, the route tracking configuration may include a tracking customization to the scheduled start and/or end time of a route. This allows fleet managers to expand the route tracking window during which the movement of the vehicle is tracked based on acceptable ranges of the fleet manager.

Similarly, the route tracking configuration may include a tracking customization to the scheduled arrival and/or departure time of the scheduled stops. This allows fleet managers with time sensitive routes, such as city busses, to track arrivals and departures using a smaller time window. In contrast, fleet managers with less time sensitive routes may select to track arrivals and departures using a larger time window that is acceptable to the fleet manager.

As another example, the route tracking configuration may include a tracking customization that defines a threshold period of time used to determine whether a vehicle has arrived and/or departed from a scheduled stop. This allows fleet managers to configure how stops are tracked based on the nature of the particular fleet. For example, the threshold period of time can be set to a relatively short period of time for fleets such as city busses that may not stop at each scheduled stop and/or generally stop for short periods of time. Alternatively, the threshold period of time can be set to a relatively longer period of time for fleets including vehicle such as long hauling trucks that stop and remain at each stop for a relatively long duration.

FIG. 1 shows a system 100 for providing customized route tracking. As shown, multiple devices (i.e., vehicle 102, client device 104, and route management system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1000 shown in FIG. 10.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The vehicle 102 may be any type of vehicle, such as an automobile, semi-trailer truck, plane, bus, train, ship, and the like. As shown, the vehicle 102 includes a network gateway device 110 (e.g., vehicle gateway) that allows for remote communication between the vehicle 102 and one or more remote computing devices via the communication network 108.

The network gateway device 110 is a hardware device that acts as a gate to a network and enables traffic to flow in and out of the network to other networks. For example, the network gateway device 110 can be established as an edge device of a network or system of nodes within the vehicle 102 (e.g., vehicle networking system). For example, the network or system of nodes may include a variety of sensors, computing devices (e.g., electronic control units (ECUs), actuators, etc., deployed within the vehicle. The network gateway device 110 facilitates wireless communication capabilities by connecting to wireless networks (e.g., cellular, wireless local area network, satellite communication networks, etc.), for purposes of communicating with remote computing devices. The network gateway device 110 may also provide additional functionality, such as firewall functionality by filtering inbound and outbound communications, disallowing incoming communications from suspicious or unauthorized sources, etc.

Use of the network gateway device 110 allows for a remote computing device to transmit data and/or commands to the vehicle 102. Similarly, the network gateway device 110 allows for the vehicle 102 to transmit data, such as sensor data gathered by sensors of the vehicle 102, to a remote computing device. The vehicle 102 may be equipped with a variety of sensors that capture data describing performance of a vehicle and its surroundings. For example, the sensors may include engine speed sensors, fuel temperature sensors, voltage sensors, pressure sensors, radar sensors, light detection and ranking (LIDAR) sensors, imaging sensors (e.g., camera, video camera), and the like.

The route management system 106 is one or more computing devices that allow for generation and management of routes as well as automated route tracking. For example, the route management system 106 may allow administrators to generate routes and assign the generated routes to vehicles 102. The route management system 106 may also provide automated route tracking of the vehicles based on the assigned routes.

To utilize the functionality of the route management system 106, users (e.g., fleet managers) may use a client device 104 that is connected to the communication network 108 by direct and/or indirect communication. Although the shown system 100 includes only one client device 104 and one vehicle 102, this is only for ease of explanation and is not meant to be limiting. One skilled in the art would appreciate that the system 100 can include any number of client devices 104 and/or vehicles. Further, the route management system 106 may concurrently accept communications from and initiate communication messages and/or interact with any number of client devices 104 and vehicles 102, and support connections from a variety of different types of client devices 104, such as desktop computers; mobile computers; mobile communications devices, e.g., mobile phones, smart phones, tablets; smart televisions; set-top boxes; and/or any other network enabled computing devices. Hence, the client devices 104 may be of varying type, capabilities, operating systems, and so forth.

A user interacts with a route management system 106 via a client-side application installed on the client device 104. In some embodiments, the client-side application includes a component specific to the route management system 106. For example, the component may be a stand-alone application, one or more application plug-ins, and/or a browser extension. However, the users may also interact with the route management system 106 via a third-party application, such as a web browser or messaging application, that resides on the client device 104 and is configured to communicate with the route management system 106. In either case, the client-side application presents a user interface (UI) for the user to interact with the route management system 106. For example, the user interacts with the route management system 106 via a client-side application integrated with the file system or via a webpage displayed using a web browser application.

As discussed earlier, the route management system 106 enables fleet managers to generate and track vehicle routes. For example, the route management system 106 may provide a user interface that allows fleet managers to generate vehicle routes. A vehicle route is a route to be traversed by a vehicle that is defined by a set of route variables. For example, the set of route variables may include a beginning and ending geographic location of the route, scheduled geographic stops along the route, an order at which the vehicle is to stop at each scheduled stop, a scheduled beginning and ending time of the route, a scheduled arrival and departure time at the scheduled stops, and the like.

The user interface provided by the route management system 106 enables fleet managers to select the set of route variables to define a route. For example, the user interface may provide a listing of geographic locations and times that a fleet manager may select from to define a route. A fleet manager may use the user interface to select geographic locations to be includes in the route, such as a beginning location, end location, and scheduled stops, as well as select an order in which the geographic locations are to be traversed along the route. The user interface may also enable a fleet manager to assign times to the selected geographic locations, such as scheduled start time, arrival time, and/or departure time for each.

The user interface may also enable fleet managers to assign the generated routes to individual vehicles and/or vehicle operators. For example, the user interface may present a listing of individual vehicles and/or vehicle operators from which the fleet manager may select. As another example, the user interface may enable an administrator to enter data identifying a vehicle or vehicle operator, as well as enter a new vehicle or vehicle operator.

The route management system 106 provides for automated tracking of the vehicles based on the routes assigned by the fleet manager. For example, the route management system 106 receives sensor data describing the location and/or motion of the vehicle 102, which the route management system 106 uses to track location of the vehicle 102. The sensor data may be received from the vehicle 102 and/or from a client device 104 of the vehicle operator.

The route management system 106 uses the set of route variables defining a route along with the sensor data describing the geographic location and/or movement of the vehicle 102 to generate a route tracking report describing the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

As explained earlier, different types of fleets operate in varying ways. For example, long hauling trucks operate differently than city busses in that long hauling trucks stop and remain at each stop for a relatively long duration, whereas a city bus may not stop at each stop and generally stops for a short period of time. Further, a city bus generally operates according to a tight time schedule for arrival at each stop, whereas the timeliness of a long hauling truck may be looser. Tracking different types of fleets should therefore be performed in a manner based on the operation of the type of fleet.

To allow for customized route tracking, the route management system 106 enables fleet managers to set route tracking configurations for tracking vehicles. A route tracking configuration includes one or more tracking customizations to the set of route variables defining each route. For example, the route tracking configuration may include a tracking customization to the scheduled start and/or end time of a route. This allows fleet managers to expand the route tracking window during which the movement of the vehicle is tracked based on acceptable ranges of the fleet manager.

Similarly, the route tracking configuration may include a tracking customization to the scheduled arrival and/or departure time of the scheduled stops. This allows fleet managers with time sensitive routes, such as city busses, to track arrivals and departures using a smaller time window. In contrast, fleet managers with less time sensitive routes may select to track arrivals and departures using a larger time window that is acceptable to the fleet manager.

As another example, the route tracking configuration may include a tracking customization that defines a threshold period of time used to determine whether a vehicle has arrived and/or departed from a scheduled stop. This allows fleet managers to configure how stops are tracked based on the nature of the particular fleet. For example, the threshold period of time can be set to a relatively short period of time for fleets such as city busses that may not stop at each scheduled stop and/or generally stop for short periods of time. Alternatively, the threshold period of time can be set to a relatively longer period of time for fleets including vehicle such as long hauling trucks that stop and remain at each stop for a relatively long duration.

The route management system 106 uses the route tracking configuration associated with an account and/or vehicle 102 when generating a route tracking report. For example, the route management system 106 may use sensor data received during a route tracking window defined by the route tracking configuration. As another example, the route management system 106 may determine whether a vehicle 102 has completed scheduled stops based on the threshold period of time defined by the route tracking configuration.

The route management system 106 may provide the generated route tracking report to a specified recipient or recipients. For example, the route management system 106 may transmit the route tracking report to the client device 104 of a fleet manager or other user via email, text message, and the like. The route management system 106 may also store the generated route tracking report, which may be accessed by a user using a client device 104 to interact with the route management system.

In some embodiments, the route management system 106 may transmit notifications based on the data included in the route tracking report. For example, the route management system 106 may transmit a notification to a client device 104 of a vehicle operator indicating that the vehicle operator has missed a scheduled stop, is behind schedule, is not on the correct route, and the like. Similarly, the route management system 106 may transmit a notification to a client device 104 of a fleet manager or other user to provide status updates associated with a route, such as the vehicle having started at a route, arriving at a scheduled stop, left a scheduled stop, missed a scheduled stop, completed the route, and the like.

Figure 2:
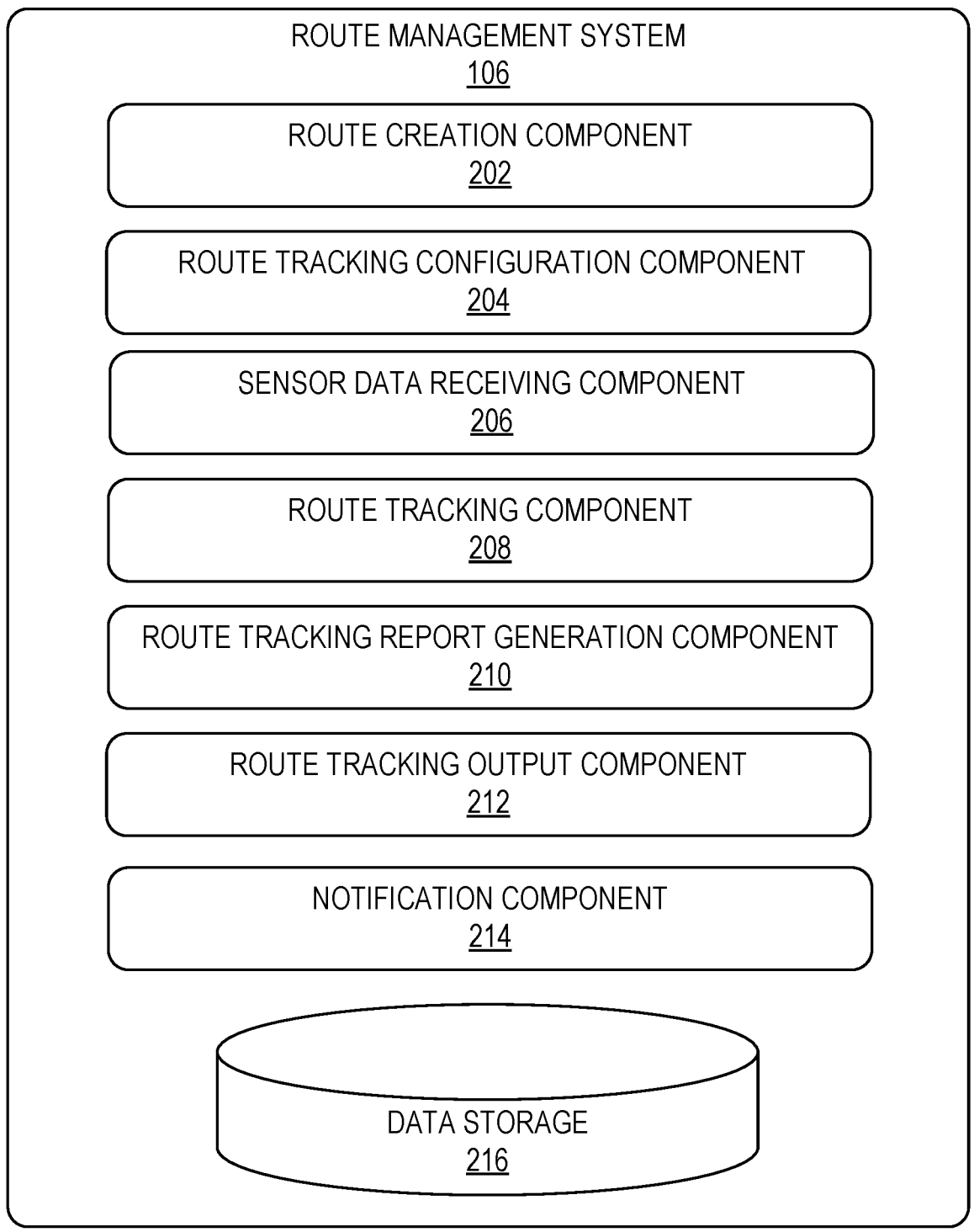
FIG. 2 is a block diagram of the route management system, according to some example embodiments.

FIG. 2 is a block diagram of the route management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the route management system 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the route management system 106 includes a route creation component 202, a route tracking configuration component 204, a sensor data receiving component 206, a route tracking component 208, a route tracking report generation component 210, a route tracking output component 212, a notification component 214, and a data storage 216.

The route creation component 202 enables fleet managers to generate routes and assign routes to vehicles 102. For example, the route creation component 202 may provide a user interface that allows fleet managers to generate vehicle routes. A vehicle route is a route to be traversed by a vehicle that is defined by a set of route variables. For example, the set of route variables may include a beginning and ending geographic location of the route, scheduled geographic stops along the route, an order at which the vehicle is to stop at each scheduled stop, a scheduled beginning and ending time of the route, a scheduled arrival and departure time at the scheduled stops, and the like.

The user interface provided by the route creation component 202 enables fleet managers to select the set of route variables for a route. For example, the user interface may provide a listing of geographic locations and times that a fleet manager may select from to define a route. A fleet manager may use the user interface to select geographic locations to be includes in the route, such as a beginning location, end location, and scheduled stops, as well as select an order in which the geographic locations are to be traversed along the route. The user interface may also enable a fleet manager to assign times to the selected geographic locations, such as scheduled start time, arrival time, and/or departure time for each.

The user interface may also enable fleet managers to assign the generated routes to individual vehicles and/or vehicle operators. For example, the user interface may present a listing of individual vehicles and/or vehicle operators from which the fleet manager may select. As another example, the user interface may enable an administrator to enter data identifying a vehicle or vehicle operator, as well as enter a new vehicle or vehicle operator.

The route creation component 202 stores data defining the created routes in the data storage 216, where it can be accessed by other components of the route management system 106. For example, the data stored in the data storage 216 may be associated with an account of the route management system 106 and/or specific vehicles 102 to which the route has been assigned.

The route tracking configuration component 204 enables fleet managers to select route tracking configurations for tracking vehicles. As explained earlier, different types of fleets operate in varying ways. For example, long hauling trucks operate differently than city busses in that long hauling trucks stop and remain at each stop for a relatively long duration, whereas a city bus may not stop at each stop and generally stops for a short period of time.

To allow for customized route tracking, the route management system 106 enables fleet managers to set route tracking configurations for tracking vehicles. A route tracking configuration includes one or more tracking customizations to the set of route variables defining each route. For example, the route tracking configuration may include a tracking customization to the scheduled start and/or end time of a route. This allows fleet managers to expand the route tracking window during which the movement of the vehicle is tracked based on acceptable ranges of the fleet manager.

The route tracking configuration component 204 provides a user interface that enables fleet managers to select the route tracking configurations. For example, the user interface may include user interface elements, such as buttons, checkboxes, and text fields, which a fleet manager may use to select and/or enter the route tracking configurations. In some embodiments, the user interface may provide a selection of available route tracking configurations that a fleet manager may select from or define. For example, the user interface may enable a fleet manager to select a route tracking window start time and/or end time, route stop time, route stop thresholds, route stop timeliness windows, and the like. The route tracking configuration component 204 stores the provided route tracking configurations in the data storage 216, where they can be accessed by other components of the route management system 106. For example, the route tracking configurations stored in the data storage 216 may be associated with an account of the route management system 106 and/or specific vehicles 102 to which the route has been assigned.

The sensor data receiving component 206 receives sensor data used to provide automated route tracking. For example, the sensor data receiving component 206 receives sensor data describing the location and/or motion of a vehicle 102. The sensor data may be received from the vehicle 102 and/or from a client device 104 of the vehicle operator that is operating the vehicle 102.

The route tracking component 208 provides for automated tracking of the vehicles. The route tracking component 208 uses the set of route variables defining a route along with the sensor data describing the geographic location and/or movement of the vehicle 102 to track the vehicle's movement along its assigned route. This includes determining a current status of the vehicle 102, whether the vehicle 102 has arrived at scheduled stops, and the like. The route tracking component 208 uses the route tracking configuration associated with an account and/or vehicle 102 when tracking a vehicle 102. For example, the route tracking component 208 may use sensor data received during a route tracking window defined by the route tracking configuration when tracking the vehicle. As another example, the route tracking component 208 may determine whether a vehicle 102 has completed scheduled stops based on the threshold period of time defined by the route tracking configuration.

The route tracking report generation component 210 generates a route tracking report based on the route tracking performed by the route tracking component 208. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

The route tracking output component 212 provides the route tracking report to a fleet manager or other user. For example, the route tracking output component 212 may transmit the route tracking report to the client device 104 of a fleet manager or other user via email, text message, and the like. As another example, the route tracking output component 212 may provide the route tracking report within a user interface that can be accessed by a fleet manager. For example, a fleet manager may use a client device 104 to interact with the route management system 106 to and access the user interface provided by the route tracking output component 212.

Figure 3:
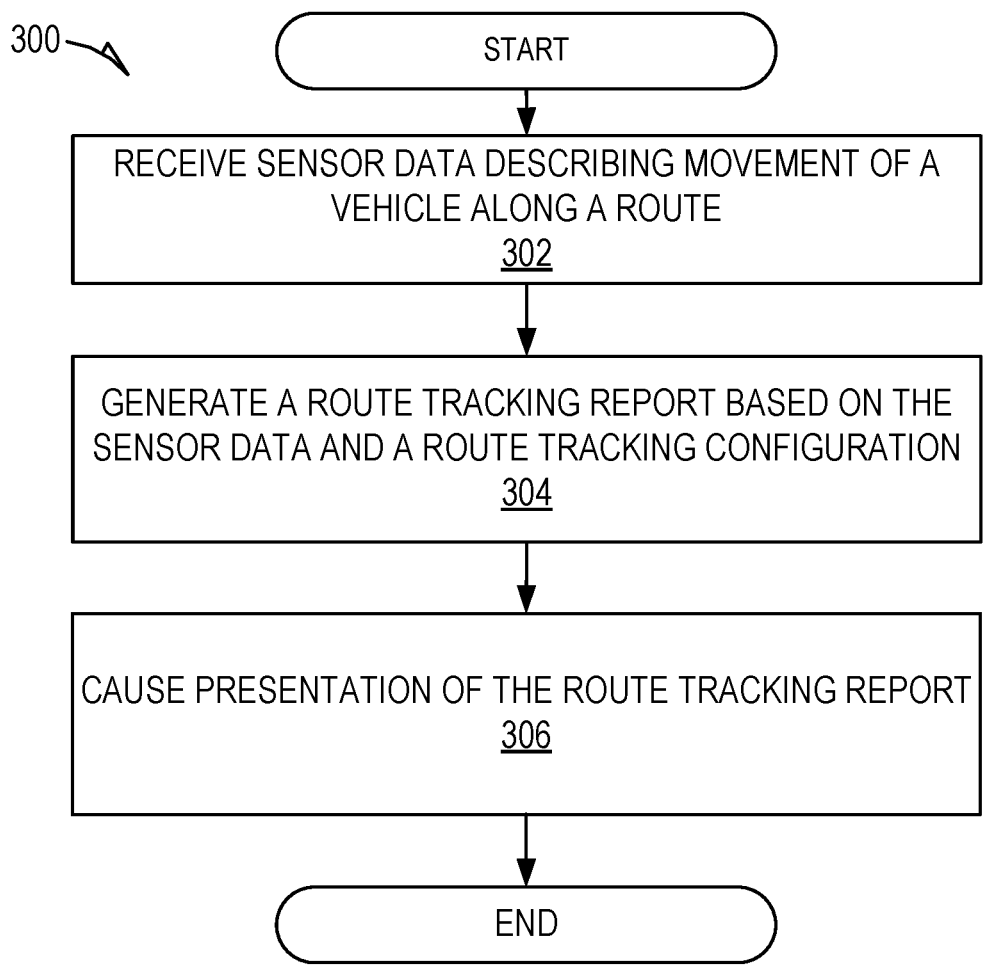
FIG. 3 is a flowchart showing a method for customized route tracking according to some example embodiments.

The notification component 214 transmits notifications based on the data included in a route tracking report. For example, the notification component 214 may transmit a notification to a client device 104 of a vehicle operator indicating that the vehicle operator has missed a scheduled stop, is behind schedule, is not on the correct route, and the like. Similarly, the notification component 214 may transmit a notification to a client device 104 of a fleet manager or other user to provide status updates associated with a route, such as the vehicle having started at a route, arriving at a scheduled stop, left a scheduled stop, missed a scheduled stop, completed the route, and the like FIG. 3 is a flowchart showing a method 300 for customized route tracking according to some example embodiments. The method 300 may be embodied in computer readable instructions for execution by one or more processors such that the operations of the method 300 may be performed in part or in whole by the route management system 106; accordingly, the method 300 is described below by way of example with reference thereto. However, it shall be appreciated that at least some of the operations of the method 300 may be deployed on various other hardware configurations and the method 300 is not intended to be limited to the route management system 106.

At operation 302, the sensor data receiving component 206 receives sensor data describing movement of a vehicle 102 along a route. The sensor data receiving component 206 receives sensor data used to provide automated route tracking. For example, the sensor data receiving component 206 receives sensor data describing the location and/or motion of a vehicle 102. The sensor data may be received from the vehicle 102 and/or from a client device 104 of the vehicle operator that is operating the vehicle 102.

At operation 304, the route tracking report generation component 210 generates a route tracking report based on the sensor data and a route tracking configuration. The route tracking report generation component 210 generates a route tracking report based on the route tracking performed by the route tracking component 208. The route tracking report describes the tracked movement of the vehicle 102 in relation to its assigned route. For example, the route tracking report may indicate whether the vehicle 102 began and/or ended its route on time, arrived at each of its scheduled stops, arrived and/or departed from each scheduled stop on time, completed the route in the correct order, and the like.

The route tracking component 208 provides for automated tracking of the vehicles. The route tracking component 208 uses the set of route variables defining a route along with the sensor data describing the geographic location and/or movement of the vehicle 102 to track the vehicle's movement along its assigned route. This includes determining a current status of the vehicle 102, whether the vehicle 102 has arrived at scheduled stops, and the like. The route tracking component 208 uses the route tracking configuration associated with an account and/or vehicle 102 when tracking a vehicle 102. For example, the route tracking component 208 may use sensor data received during a route tracking window defined by the route tracking configuration when tracking the vehicle. As another example, the route tracking component 208 may determine whether a vehicle 102 has completed scheduled stops based on the threshold period of time defined by the route tracking configuration.

At operation 306, the route tracking output component 212 causes presentation of the route tracking report. For example, the route tracking output component 212 provides the route tracking report to a fleet manager or other user. In some embodiments, the route tracking output component 212 may transmit the route tracking report to the client device 104 of a fleet manager or other user via email, text message, and the like. As another example, the route tracking output component 212 may provide the route tracking report within a user interface that can be accessed by a fleet manager. For example, a fleet manager may use a client device 104 to interact with the route management system 106 to and access the user interface provided by the route tracking output component 212.

Figure 4:
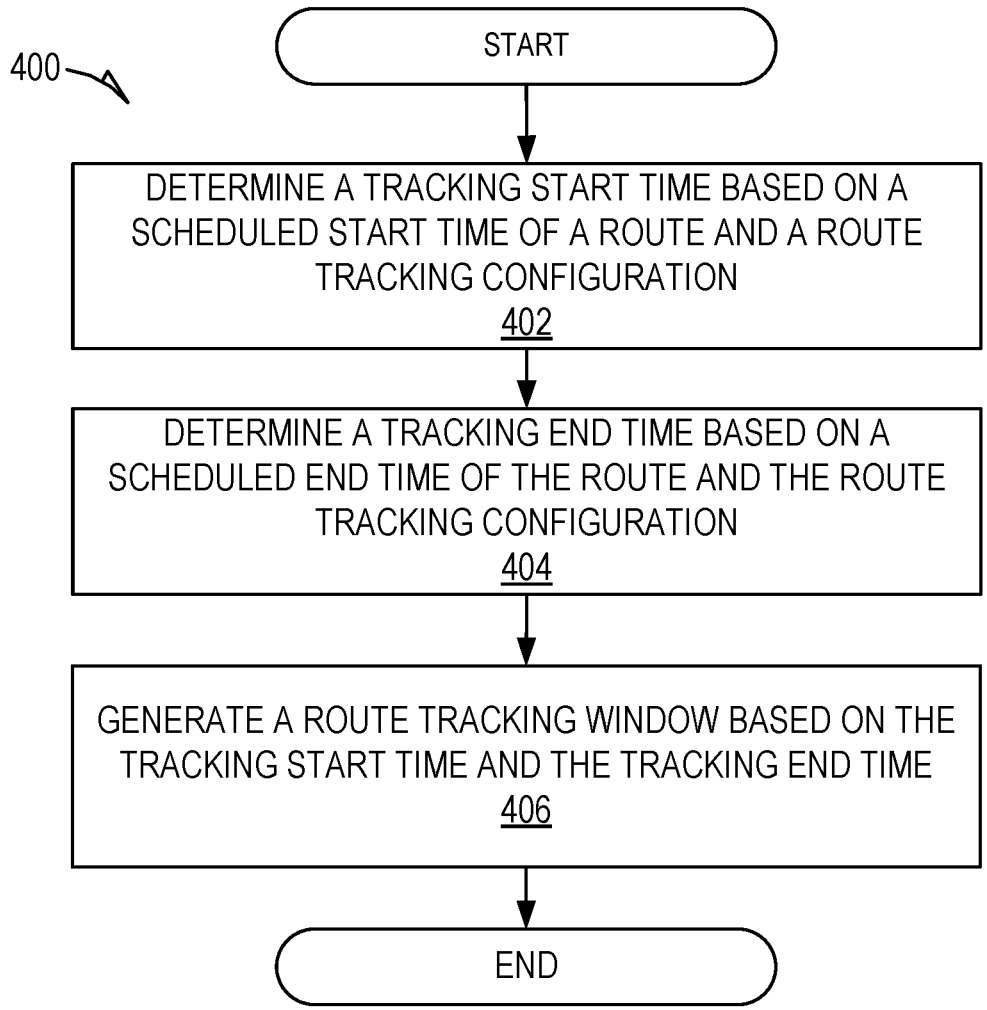
FIG. 4 is a flowchart showing a method for generating a route tracking window, according to some example embodiments.

FIG. 4 is a flowchart showing a method 400 for generating a route tracking window, according to some example embodiments. The method 400 may be embodied in computer readable instructions for execution by one or more processors such that the operations of the method 400 may be performed in part or in whole by the route management system 106; accordingly, the method 400 is described below by way of example with reference thereto. However, it shall be appreciated that at least some of the operations of the method 400 may be deployed on various other hardware configurations and the method 400 is not intended to be limited to the route management system 106.

At operation 402, the route tracking component 208 determines a tracking start time based on a scheduled start time of a route and a route tracking configuration. The scheduled start time defines a scheduled time at which a vehicle operator is to begin a route. The route tracking configuration may include data defining an amount of time prior to the scheduled start time of a route at which the route tracking window should begin. The route tracking component 208 uses the scheduled start time and the amount of time prior to the scheduled start time (e.g., 1 hour before the scheduled start time) to determine a tracking start time.

At operation 404, the route tracking component 208 determines a tracking end time based on a scheduled end time of the route and the route tracking configuration. The scheduled end time defines a scheduled time at which a vehicle operator is to end a route. The route tracking configuration may include data defining an amount of time after to the scheduled end time of a route at which the route tracking window should end. The route tracking component 208 uses the scheduled end time and the amount of time after the scheduled start time (e.g., 1 hour after the scheduled end time) to determine a tracking end time.

At operation 406, the route tracking component 208 generates a route tracking window based on the tracking start time and the tracking end time. The route tracking window defines a period of time starting at the tracking start time and the tracking end time during which movement of the vehicle 102 is tracked. Accordingly, the route tracking window is equal to or greater in time than the scheduled route window of a route. For example, the route tracking window may begin prior to the scheduled start time of the route and/or end after the scheduled end time of the route as defined by the route tracking configuration.

Figure 5:
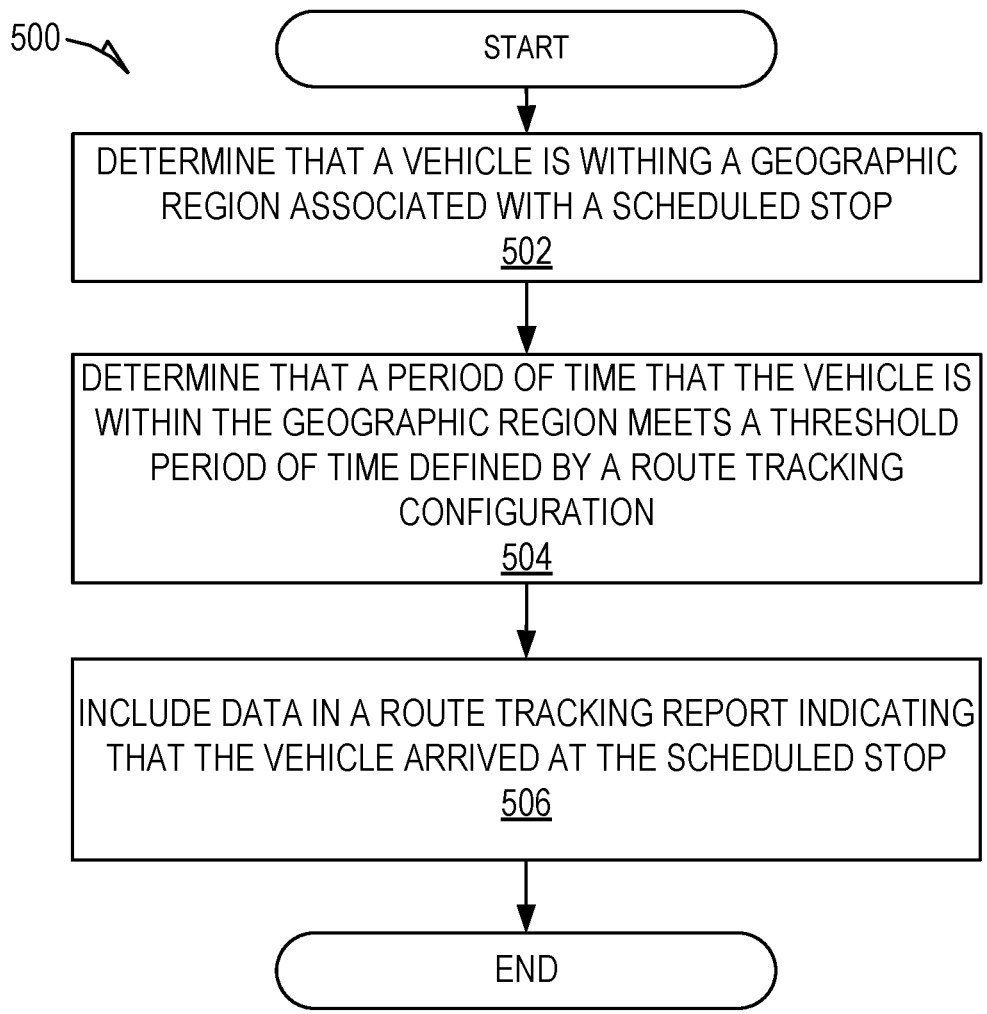
FIG. 5 is a flowchart showing a method for determining that a vehicle has arrived at a scheduled stop, according to some example embodiments.

FIG. 5 is a flowchart showing a method 500 for determining that a vehicle has arrived at a scheduled stop, according to some example embodiments. The method 500 may be embodied in computer readable instructions for execution by one or more processors such that the operations of the method 500 may be performed in part or in whole by the route management system 106; accordingly, the method 500 is described below by way of example with reference thereto. However, it shall be appreciated that at least some of the operations of the method 500 may be deployed on various other hardware configurations and the method 500 is not intended to be limited to the route management system 106.

At operation 502, the route tracking component 208 determines that a vehicle 102 is within a geographic region associated with a scheduled stop. The route tracking component 208 determines the geographic location of the vehicle 102 based on sensor data received by the sensor data receiving component 206. The route tracking component 208 uses the determined geographic location of the vehicle 102 to determine whether the vehicle 102 is located within the geographic region associated with a scheduled stop on a route assigned to the vehicle 102. The geographic region associated with the scheduled stop may be defined by a geo-fence that encompasses the scheduled stop. For example, the route tracking component 208 determines that the vehicle 102 is within the geographic region associated with the scheduled stop when the determined geographic location of the vehicle 102 falls within the geofence that encompasses the scheduled stop.

At operation 504, the route tracking component 208 determines that a period of time that the vehicle 102 is within the geographic region meets a threshold period of time defined by a route tracking configuration. After determining that the vehicle 102 has entered the geographic region associated with the scheduled stop, the route tracking component 208 may begin tracking a continuous period of time that the vehicle 102 remains within the geographic region associated with the scheduled stop. A fleet manager defines a threshold period of time for determining that a vehicle has arrived at a scheduled stop. For example, the threshold period of time may be provided in route tracking configurations provided by the fleet manager. The route tracking component 208 uses the provided route tracking configuration to determine whether the period of time that the vehicle 102 is within the geographic region meets the threshold period of time defined by a route tracking configuration.

At operation 506, the route tracking report generation component 210 includes data in a route tracking report indicating that the vehicle 102 arrived at the scheduled stop. This may include updating a user interface to indicate that the vehicle 102 arrived at the scheduled stop, as well as providing additional detail, such as the time at which the vehicle 102 arrived at the scheduled stop and an estimated departure time of the vehicle 102 from the scheduled stop.

Figure 6:
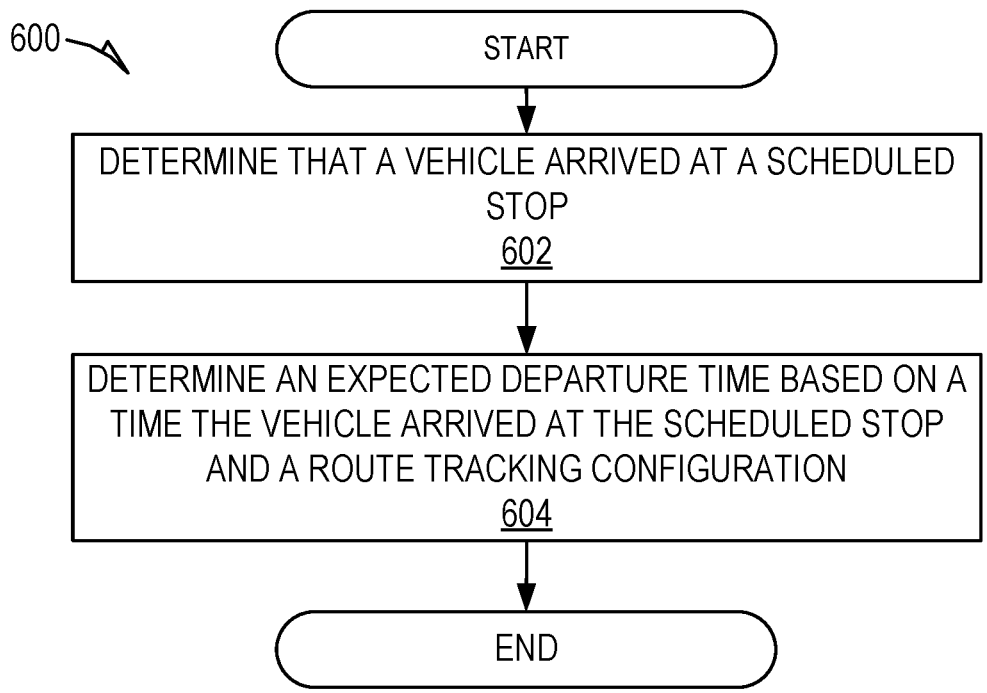
FIG. 6 is a flowchart showing a method for determining an expected departure time, according to some example embodiments.

FIG. 6 is a flowchart showing a method 600 for determining an expected departure time, according to some example embodiments. The method 600 may be embodied in computer readable instructions for execution by one or more processors such that the operations of the method 600 may be performed in part or in whole by the route management system 106; accordingly, the method 600 is described below by way of example with reference thereto. However, it shall be appreciated that at least some of the operations of the method 600 may be deployed on various other hardware configurations and the method 600 is not intended to be limited to the route management system 106. For example, the method 600 may be performed by the route management system 106 and/or the client device 104.

At operation 602, the route tracking component 208 determines that a vehicle 102 arrived at a scheduled stop. For example, the route tracking component 208 determines the vehicle 102 that a period of time that the vehicle 102 is within the geographic region meets a threshold period of time defined by a route tracking configuration, as described in relation to FIG. 5.

At operation 604, the route tracking component 208 determine an expected departure time based on a time that the vehicle 102 arrived at the scheduled stop and a route tracking configuration. The route tracking configuration may include an expected amount of time that a vehicle 102 will remain at a scheduled stop as defined by a fleet manager. For example, may define a number of hours and/or minutes to define the expected amount of time that a vehicle 102 will remain at a scheduled stop. The route tracking component 208 uses the expected amount of time and the arrival time of the vehicle 102 to determine an expected departure time from the scheduled stop. For example, the route tracking component 208 may add the expected amount of time to the arrival time to determine the expected departure time.

Figure 7A:
Figure 7A:

FIGS. 7A-7D show a user interface 700 for setting route tracking configurations, according to some example embodiments. As shown in FIG. 7A, the user interface 700 enables a fleet manager to set a route tracking window for tracking a vehicle 102. The route tracking window defines a period of time that is equal to or greater to the scheduled route window of a route during which movement of the vehicle 102 is tracked. For example, the route tracking window may begin prior to the scheduled start time of the route and/or end after the scheduled end time of the route. As shown, the user interface 700 includes a start tracking window text box 702 and an end tracking window text box 704. The start tracking window text box 702 enables a fleet manager to define an amount of time prior to the scheduled start time of a route at which the route tracking window should begin. Similarly, the end tracking window text box 704 enables a fleet manager to define an amount of time after the scheduled end time of a route at which the route tracking window should end.

Figure 7B:
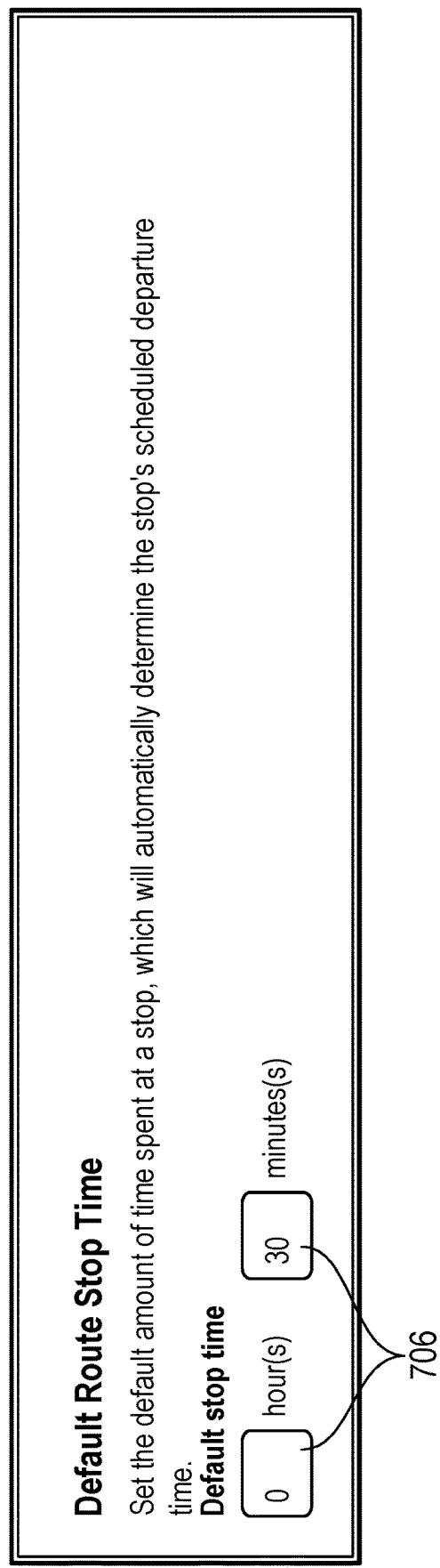

The user interface 700 shown in FIG. 7B includes a default route stop time text box 706 that enables a fleet manager to establish an expected amount of time that a vehicle 102 will remain at a scheduled stop. For example, the default route stop time text box 706 enables a fleet manager to enter a number of hours and/or minutes to define the expected amount of time that a vehicle 102 will remain at a scheduled stop. The expected amount of time may be used to determine an expected departure time from the scheduled stop.

As shown in FIG. 7C, the user interface 700 enables a fleet manager to set route stop thresholds for tracking vehicle 102 arrivals and departures from scheduled stops. The route stop thresholds defines a threshold period of time that a vehicle 102 should be within a geographic region of a scheduled stop to qualify as having arrived at the scheduled stop and a threshold period of time that a vehicle 102 has left the geographic region of the scheduled stop to qualify as having departed from the scheduled stop. The configurable route stop thresholds allow a fleet manager to customize route tracking based on the type of fleet. For example, a fleet manager may set relatively shorter route stop thresholds for vehicles 102, such as city busses, that stop for a short period of time at a scheduled stop and in some cases do not stop at a scheduled stop. As another example, a fleet manager may set relatively longer route stop thresholds for vehicles 102, such as long-haul trucks, that stop for a longer period of time at a scheduled stop.

As shown, the user interface 700 includes an arrival threshold text box 708 and a departure threshold text box

710. The arrival threshold text box 708 enables a fleet manager to define the threshold period of time that a vehicle 102 should be within a geographic region of a scheduled stop to qualify as having arrived at the scheduled stop. The departure threshold text box 710 enables a fleet manager to define the threshold period of time that a vehicle 102 should have left a geographic region of a scheduled stop to qualify as having departed the scheduled stop.

Figure 7D:
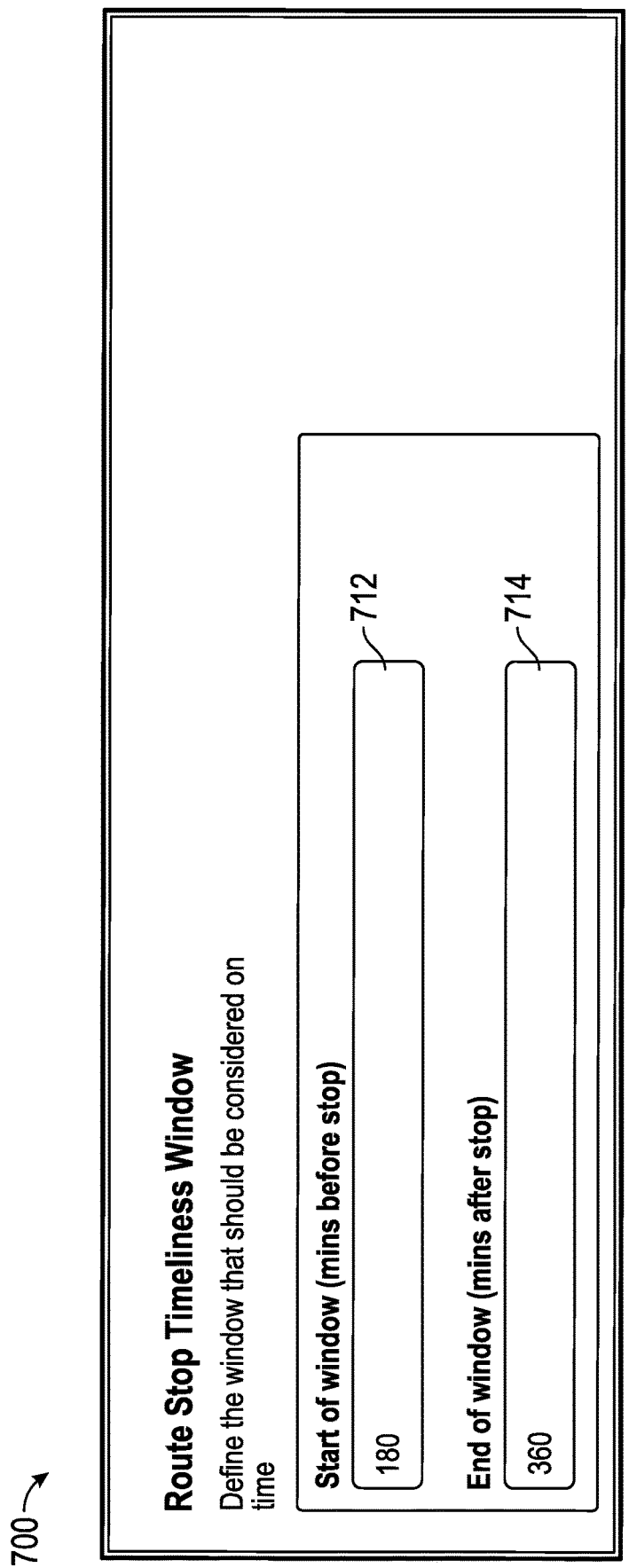

FIG. 7D shows a user interface 700 that enables a fleet manager to establish a route stop timeliness window for tracking a vehicle 102. A route stop timeliness window defines a period of time that encompasses a scheduled associated with a scheduled stop during which arrival or the vehicle 102 is considered to be on time. For example, the route stop timeliness window begin prior to the scheduled arrival time and/or end after the scheduled arrival time of the scheduled stop. This allows a fleet manager to configure the route stop timeliness window based in the specific purpose of their fleet. For example, the route stop timeliness window may be set to a smaller window for use with fleets where arriving at the scheduled arrival time is of higher importance, such with city busses. Alternatively, the route stop timeliness window may be set to a larger window for use with fleets where arriving at the scheduled arrival time is of lesser importance.

As shown, the user interface 700 includes a start timeliness window text box 712 and an end timeliness window text box 714. The start timeliness window text box 712 enables a fleet manager to define an amount of time prior to the scheduled arrival time at which the stop timeliness window should begin. Similarly, the end timeliness window text box 714 enables a fleet manager to define an amount of time after the scheduled arrival time of a scheduled stope at which the stop timeliness window should end.

Figure 8:
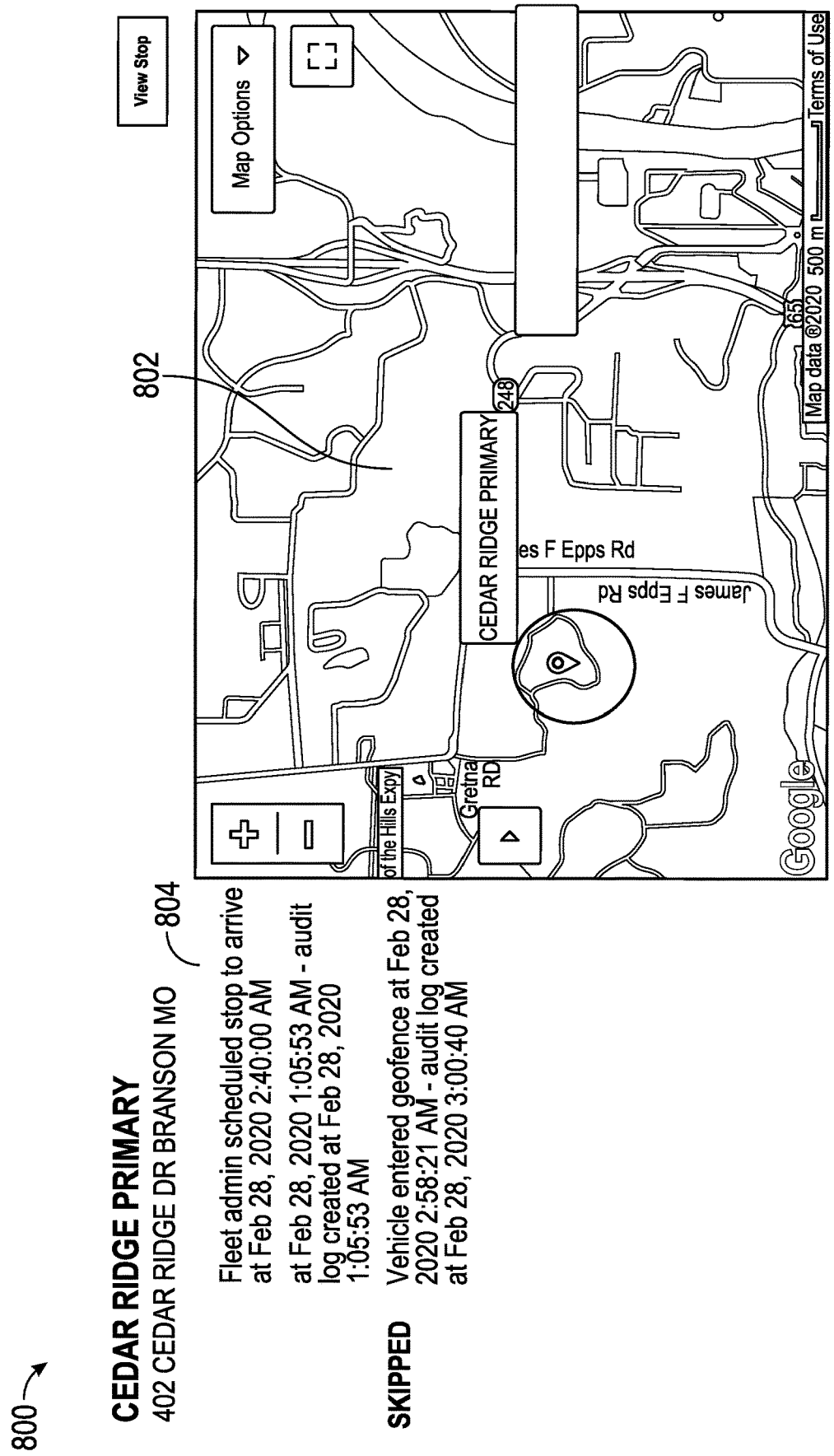
FIG. 8 shows a route tracking report, according to some example embodiments.

FIG. 8 shows a route tracking report 800, according to some example embodiments. As shown, the route tracking report 800 includes a map view 802 that tracks the movement of the vehicle 102 along the route. The route tracking report also includes a list of scheduled stops 804. Each scheduled stop in the list of scheduled stops 804 provides a current status and additional information. For example, the list of scheduled stops 804 indicates that the vehicle operator skipped one of the scheduled stops.

Software Architecture

Figure 9:
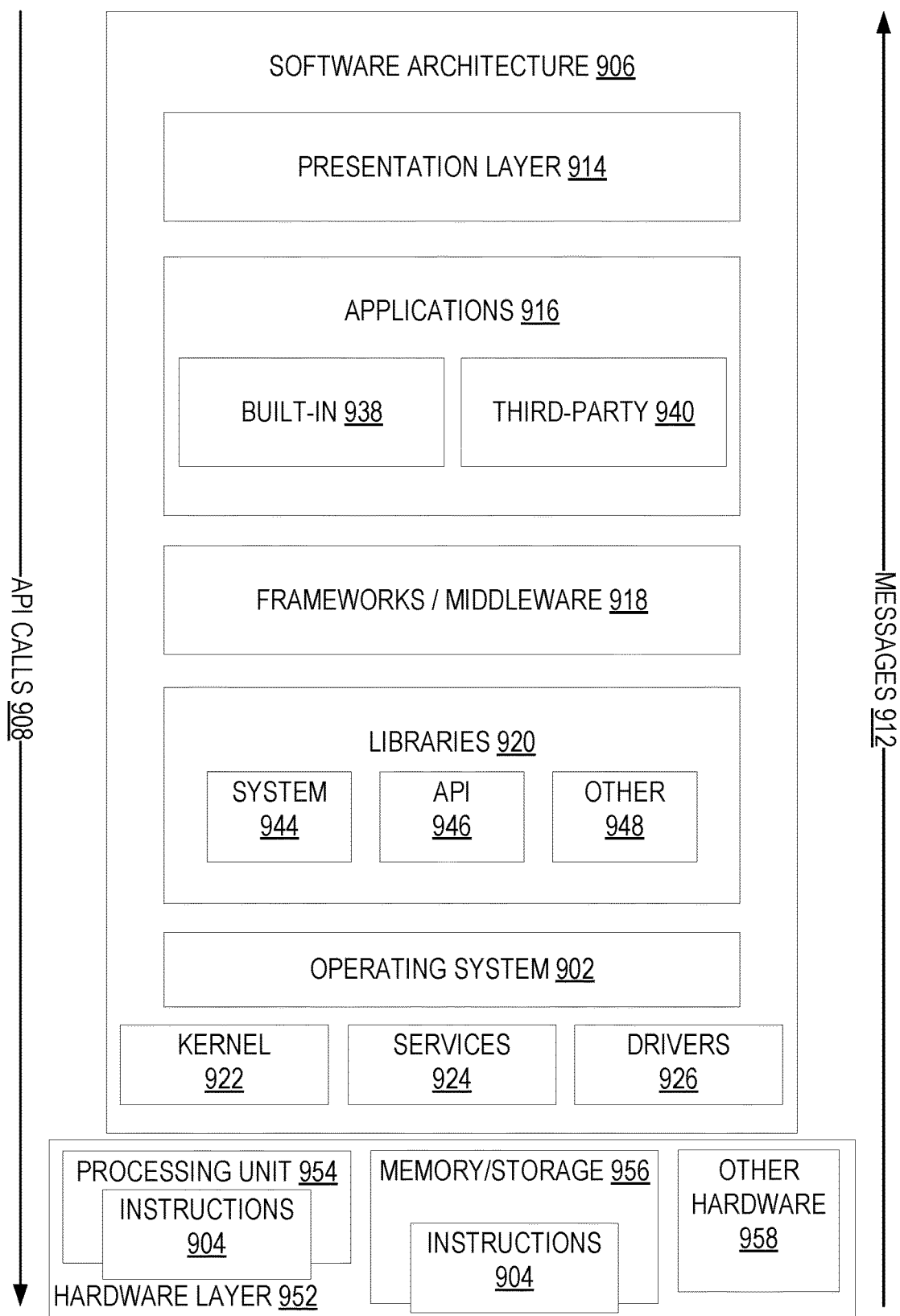
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
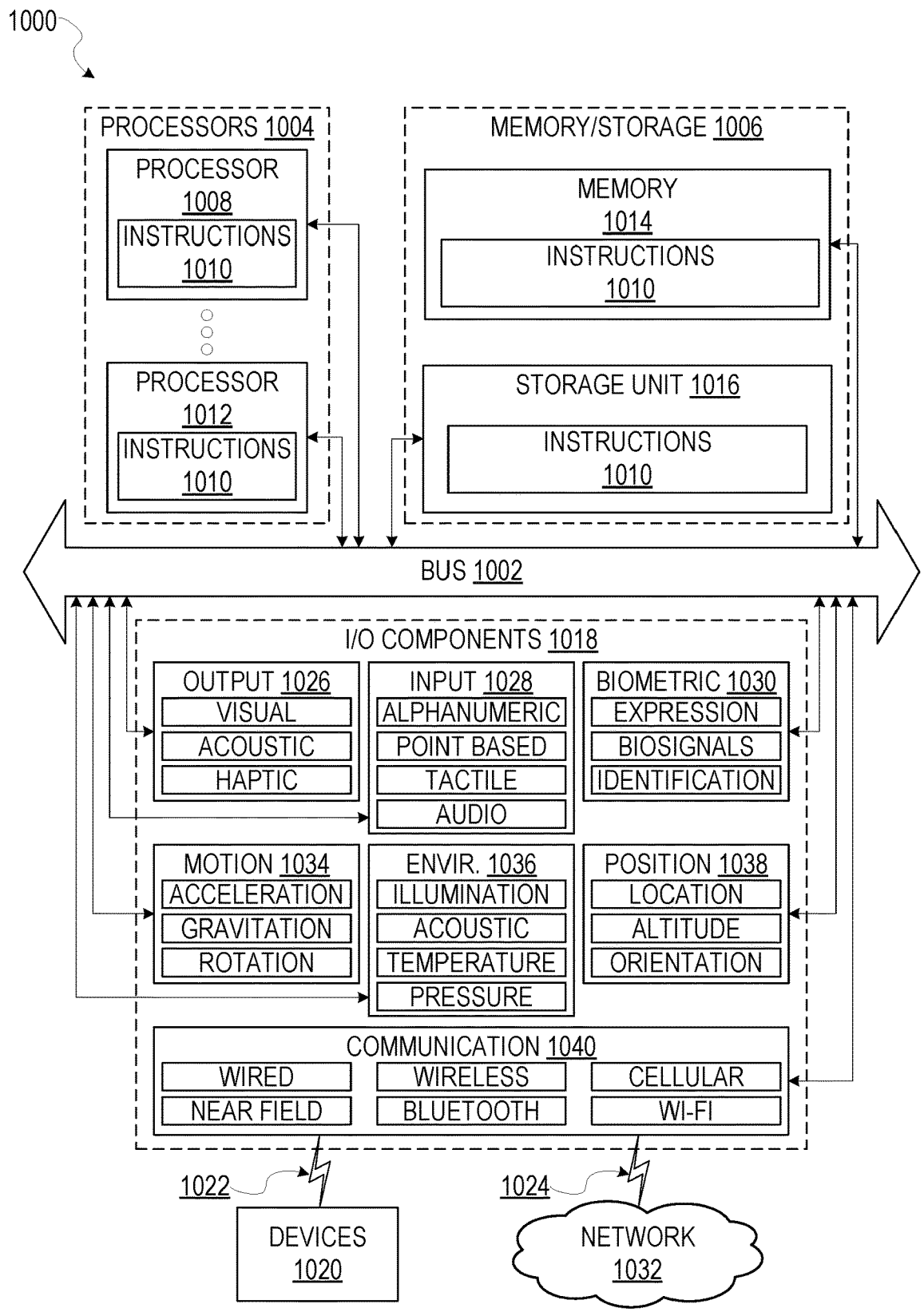
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   receiving, by a route management system, first sensor data describing movement of a first vehicle associated with a first account of the route management system, the first vehicle being assigned to travel a first route;
   receiving, by the route management system, second sensor data describing movement of a second vehicle associated with a second account of the route management system, the second vehicle being assigned to travel a second route;
   generating a first route tracking report based on the first sensor data, the first route and a first route tracking configuration associated with the first account, the first route tracking configuration including a first tracking customization to a set of route variables for tracking vehicles;
   generating a second route tracking report based on the second sensor data, the second route and a second route tracking configuration associated with the second account, the second route tracking configuration including a second tracking customization to the set of route variables for tracking vehicles, the second tracking customization being different than the first tracking customization;
   causing presentation of the first route tracking report on a first client device associated with the first account; and
   causing presentation of the second route tracking report a second client device associated with the second account.

2. The method of claim 1, wherein the set of route variables for the first route includes a start time and an end time defining a scheduled route window for the first route, and the first route tracking configuration includes a first tracking customization to the start time or the end time for the first route.

3. The method of claim 2, further comprising:
   generating a route tracking window based on the scheduled route window for the first route and the first tracking customization, the route tracking window being an expansion of the scheduled route window based on the first tracking customization, wherein the first route tracking report is generated based on sensor data describing movement of the first vehicle during the route tracking window, including sensor data describing movement of the first vehicle that is outside of the scheduled route window.

4. The method of claim 1, wherein the first route tracking configuration defines a threshold period of time for determining arrival at a scheduled stop.

5. The method of claim 4, wherein generating the first route tracking report comprises:
   determining, based on the first sensor data, that the first vehicle is within a first geographic region associated with a first scheduled stop of the first route;
   determining that a period of time that the first vehicle is within the first geographic region meets the threshold period of time defined by the first route tracking configuration; and
   including data in the first route tracking report indicating that the first vehicle arrived at the first scheduled stop of the first route.

6. The method of claim 4, wherein the first route tracking configuration further defines an expected amount of time to be spent at the scheduled stop.

7. The method of claim 6, further comprising:
determining, based on the first sensor data, that the first vehicle is within a first geographic region associated with a first scheduled stop of the first route; and
determining a departure time for the first vehicle from the first scheduled stop based on the expected amount of time defined in the first route tracking configuration.

8. A route management system comprising:
one or more computer processors; and
one or more computer-readable mediums storing instructions that, when executed by the one or more computer processors, cause the route management system to perform operations comprising:
receiving first sensor data describing movement of a first vehicle associated with a first account of the route management system, the first vehicle being assigned to travel a first route;
receiving second sensor data describing movement of a second vehicle associated with a second account of the route management system, the second vehicle being assigned to travel a second route;
generating a first route tracking report based on the first sensor data, the first route and a first route tracking configuration associated with the first account, the first route tracking configuration including a first tracking customization to a set of route variables for tracking vehicles;
generating a second route tracking report based on the second sensor data, the second route and a second route tracking configuration associated with the second account, the second route tracking configuration including a second tracking customization to the set of route variables for tracking vehicles, the second tracking customization being different than the first tracking customization;
causing presentation of the first route tracking report on a first client device associated with the first account; and
causing presentation of the second route tracking report on a second client device associated with the second account.

9. The route management system of claim 8, wherein the set of route variables for the first route includes a start time and an end time defining a scheduled route window for the first route, and the first route tracking configuration includes a first tracking customization to the start time or the end time for the first route.

10. The route management system of claim 9, the operations further comprising:
generating a route tracking window based on the scheduled route window for the first route and the first tracking customization, the route tracking window being an expansion of the scheduled route window based on the first tracking customization, wherein the first route tracking report is generated based on sensor data describing movement of the first vehicle during the route tracking window, including sensor data describing movement of the first vehicle that is outside of the scheduled route window.

11. The route management system of claim 8, wherein the first route tracking configuration defines a threshold period of time for determining arrival at a scheduled stop.

12. The route management system of claim 11, wherein generating the first route tracking report comprises:
determining, based on the first sensor data, that the first vehicle is within a first geographic region associated with a first scheduled stop of the first route;
determining that a period of time that the first vehicle is within the first geographic region meets the threshold period of time defined by the first route tracking configuration; and
including data in the first route tracking report indicating that the first vehicle arrived at the first scheduled stop of the first route.

13. The route management system of claim 11, wherein the first route tracking configuration further defines an expected amount of time to be spent at the scheduled stop.

14. The route management system of claim 13, the operations further comprising:
determining, based on the first sensor data, that the first vehicle is within a first geographic region associated with a first scheduled stop of the first route; and
determining a departure time for the first vehicle from the first scheduled stop based on the expected amount of time defined in the first route tracking configuration.

15. A non-transitory computer-readable medium storing instructions that, when executed by one or more computer processors of a route management system, cause the route management system to perform operations comprising:
receiving first sensor data describing movement of a first vehicle associated with a first account of the route management system, the first vehicle being assigned to travel a first route;
receiving second sensor data describing movement of a second vehicle associated with a second account of the route management system, the second vehicle being assigned to travel a second route;
generating a first route tracking report based on the first sensor data, the first route and a first route tracking configuration associated with the first account, the first route tracking configuration including a first tracking customization to a set of route variables for tracking vehicles;
generating a second route tracking report based on the second sensor data, the second route and a second route tracking configuration associated with the second account, the second route tracking configuration including a second tracking customization to the set of route variables for tracking vehicles, the second tracking customization being different than the first tracking customization;
causing presentation of the first route tracking report on a first client device associated with the first account; and
causing presentation of the second route tracking report on a second client device associated with the second account.

16. The non-transitory computer-readable medium of claim 15, wherein the set of route variables for the first route includes a start time and an end time defining a scheduled route window for the first route, and the first route tracking configuration includes a first tracking customization to the start time or the end time for the first route.

17. The non-transitory computer-readable medium of claim 16, the operations further comprising:
generating a route tracking window based on the scheduled route window for the first route and the first tracking customization, the route tracking window being an expansion of the scheduled route window based on the first tracking customization, wherein the first route tracking report is generated based on sensor data describing movement of the first vehicle during the route tracking window, including sensor data describing movement of the first vehicle that is outside of the scheduled route window.

18. The non-transitory computer-readable medium of claim 15, wherein the first route tracking configuration defines a threshold period of time for determining arrival at a scheduled stop.

* * * * *